(12) United States Patent
Hudson et al.

(10) Patent No.: US 12,509,343 B2
(45) Date of Patent: Dec. 30, 2025

(54) AUTOMATED TRENCH MANUFACTURING AND ASSEMBLY FOR ATTACHING TRIM COVERS TO A CUSHION ASSEMBLY

(71) Applicant: Lear Corporation, Southfield, MI (US)

(72) Inventors: Curtis Hudson, Macomb, MI (US); Lisa Swikoski, West Bloomfield, MI (US); Michelle A. Pereny, Farmington Hills, MI (US); Jaiviknesh Kandasamy, Southfield, MI (US)

(73) Assignee: Lear Corporation, Southfield, MI (US)

( * ) Notice: Subject to any disclaimer, the term of this patent is extended or adjusted under 35 U.S.C. 154(b) by 318 days.

(21) Appl. No.: 18/176,164

(22) Filed: Feb. 28, 2023

(65) Prior Publication Data
US 2024/0286888 A1  Aug. 29, 2024

(51) Int. Cl.
*B68G 7/12* (2006.01)
*A47C 7/24* (2006.01)
(Continued)

(52) U.S. Cl.
CPC .................. *B68G 7/12* (2013.01); *A47C 7/24* (2013.01); *B21J 15/10* (2013.01); *B21J 15/147* (2013.01);
(Continued)

(58) Field of Classification Search
CPC .... B60N 2/5825; B60N 2/5891; B25J 11/007; B21J 15/10; B21J 15/142; B21J 15/147; B21J 15/32; B68G 7/12; B23P 19/001; B23P 19/006; B29C 2033/426; B29C 51/004; B29C 51/20; B29C 51/265; B29C 51/266; B29C 51/428; B29C 59/007; B29C 59/02
See application file for complete search history.

(56) References Cited

U.S. PATENT DOCUMENTS 1,621,008 A  3/1927 Fricker
2,130,935 A  9/1938 Thompson
(Continued)

FOREIGN PATENT DOCUMENTS

AU  2006227668 A1  9/2006
AU  2003296088 B2  9/2008
(Continued)

OTHER PUBLICATIONS

Airstring.com, About Airstring, Jan. 18, 2021, 13 pages.
(Continued)

*Primary Examiner* — Matthew P Travers
(74) *Attorney, Agent, or Firm* — Brooks Kushman P.C.

(57) ABSTRACT

Cushions, methods, and manufacturing systems for making the same are disclosed. The cushions may be foamless such as being made from a body of entangled and/or intertwined polymeric strands. The manufacturing systems may include a die such as die bars having a plurality of orifices that cooperate with a plurality of receptacles and actuators for discharging a plurality of fasteners from the receptacles, through the die into the cushions. In a refinement, the die may be heated such that a skinned over membrane is created in the cushion to retain the plurality of fasteners. A trim cover may cooperate with the plurality of fasteners such that it is attached to the cushion.

14 Claims, 4 Drawing Sheets

(51) Int. Cl.
  *B21J 15/10* (2006.01)
  *B21J 15/14* (2006.01)
  *B21J 15/32* (2006.01)
  *B23P 19/00* (2006.01)
  *B25J 11/00* (2006.01)
  *B29C 51/00* (2006.01)
  *B29C 51/20* (2006.01)
  *B29C 51/26* (2006.01)
  *B29C 51/42* (2006.01)
  *B29C 59/00* (2006.01)
  *B29C 59/02* (2006.01)
  *B60N 2/58* (2006.01)

(52) U.S. Cl.
  CPC ............. *B21J 15/32* (2013.01); *B23P 19/001* (2013.01); *B25J 11/007* (2013.01); *B29C 51/004* (2013.01); *B29C 51/20* (2013.01); *B29C 51/265* (2013.01); *B29C 51/266* (2013.01); *B29C 51/428* (2013.01); *B29C 59/007* (2013.01); *B29C 59/02* (2013.01); *B60N 2/5825* (2013.01); *B60N 2/5891* (2013.01)

(56) References Cited

U.S. PATENT DOCUMENTS

| | | | |
|---|---|---|---|
| 2,188,995 A | 2/1940 | Avery et al. | |
| 2,630,938 A | 3/1953 | Burnett | |
| 2,630,968 A | 3/1953 | Muskat | |
| 3,155,363 A | 11/1964 | Lohr | |
| 3,309,052 A | 3/1967 | Borisof | |
| 3,315,283 A | 4/1967 | Larsen | |
| 3,630,572 A | 12/1971 | Homier | |
| 3,689,620 A | 9/1972 | Miyazaki et al. | |
| 3,733,658 A | 5/1973 | Mitchell | |
| 3,861,747 A | 1/1975 | Diamond | |
| D239,147 S | 3/1976 | Karlsen | |
| 3,961,823 A | 6/1976 | Caudill, Jr. | |
| 4,031,579 A | 6/1977 | Larned | |
| 4,287,657 A | 9/1981 | Andre et al. | |
| 4,396,823 A | 8/1983 | Nihei et al. | |
| 4,476,594 A | 10/1984 | McLeod | |
| 4,563,387 A | 1/1986 | Takagi et al. | |
| 4,578,846 A * | 4/1986 | Schott | B21J 15/10 29/34 B |
| 4,663,211 A | 5/1987 | Kon | |
| 4,751,029 A | 6/1988 | Swanson | |
| 4,786,351 A | 11/1988 | Elliott et al. | |
| 4,859,516 A | 8/1989 | Yamanaka et al. | |
| 4,860,402 A | 8/1989 | Dichtel | |
| 4,876,135 A | 10/1989 | McIntosh | |
| 4,881,997 A | 11/1989 | Hatch | |
| 4,900,377 A | 2/1990 | Redford et al. | |
| 4,913,757 A | 4/1990 | Yamanaka et al. | |
| 4,933,224 A | 6/1990 | Hatch | |
| 4,952,265 A | 8/1990 | Yamanaka et al. | |
| 4,953,770 A | 9/1990 | Bond, Sr. | |
| 5,003,664 A | 4/1991 | Wong | |
| 5,007,676 A | 4/1991 | Lien | |
| 5,016,941 A | 5/1991 | Yokota | |
| 5,092,381 A | 3/1992 | Feijin et al. | |
| 5,095,592 A | 3/1992 | Doerfling | |
| 5,313,034 A | 5/1994 | Grimm et al. | |
| 5,378,296 A | 1/1995 | Vesa | |
| 5,381,922 A | 1/1995 | Gladman et al. | |
| 5,405,178 A | 4/1995 | Weingartner et al. | |
| D364,269 S | 11/1995 | Sabosky | |
| 5,464,488 A | 11/1995 | Servin | |
| 5,464,491 A | 11/1995 | Yamanaka | |
| 5,482,665 A | 1/1996 | Gill | |
| 5,492,662 A | 2/1996 | Kargol et al. | |
| 5,494,627 A | 2/1996 | Kargol et al. | |
| 5,536,341 A | 7/1996 | Kelman | |
| 5,551,755 A | 9/1996 | Lindberg | |
| 5,555,616 A * | 9/1996 | Michalewski | B23Q 1/603 29/243.54 |
| 5,569,641 A | 10/1996 | Smith | |
| 5,586,807 A | 12/1996 | Taggart | |
| 5,587,121 A | 12/1996 | Vesa | |
| 5,605,373 A | 2/1997 | Wildern, IV et al. | |
| 5,620,759 A | 4/1997 | Insley et al. | |
| 5,622,262 A | 4/1997 | Sadow | |
| 5,639,543 A | 6/1997 | Isoda et al. | |
| 5,669,129 A | 9/1997 | Smith et al. | |
| 5,669,799 A | 9/1997 | Moseneder et al. | |
| 5,679,296 A | 10/1997 | Kelman et al. | |
| 5,733,825 A | 3/1998 | Martin et al. | |
| 5,788,332 A | 8/1998 | Hettinga | |
| 5,811,186 A | 9/1998 | Martin et al. | |
| 5,819,408 A | 10/1998 | Catlin | |
| 5,833,321 A | 11/1998 | Kim et al. | |
| 5,966,783 A | 10/1999 | Genereux et al. | |
| 6,010,766 A | 1/2000 | Braun et al. | |
| 6,057,024 A | 5/2000 | Mleziva et al. | |
| 6,063,317 A | 5/2000 | Carroll, III | |
| 6,131,220 A | 10/2000 | Morimura | |
| 6,272,707 B1 | 8/2001 | Robrecht et al. | |
| 6,283,552 B1 | 9/2001 | Halse et al. | |
| 6,302,487 B1 | 10/2001 | Fujita et al. | |
| 6,347,790 B1 | 2/2002 | Nishibori et al. | |
| 6,378,150 B1 | 4/2002 | Minegishi et al. | |
| D461,746 S | 8/2002 | Olson et al. | |
| 6,457,218 B1 | 10/2002 | Lawrence | |
| 6,558,590 B1 | 5/2003 | Stewart | |
| 6,668,429 B2 | 12/2003 | Fujisawa et al. | |
| 6,766,201 B2 | 7/2004 | Von Arx et al. | |
| 6,776,201 B2 | 8/2004 | Willis | |
| 6,918,146 B2 | 7/2005 | England | |
| D523,330 S | 6/2006 | Mattesky | |
| 7,073,230 B2 | 7/2006 | Boville | |
| 7,100,978 B2 | 9/2006 | Ekern et al. | |
| D530,192 S | 10/2006 | Becerra | |
| 7,128,371 B2 | 10/2006 | Kawasaki et al. | |
| 7,141,768 B2 | 11/2006 | Malofsky et al. | |
| 7,158,968 B2 | 1/2007 | Cardno | |
| D538,704 S | 3/2007 | Kaminski | |
| 7,290,300 B1 | 11/2007 | Khambete | |
| 7,377,762 B2 | 5/2008 | Nishibori et al. | |
| 7,427,103 B2 | 9/2008 | Weber | |
| 7,481,489 B2 | 1/2009 | Demick | |
| 7,506,939 B2 | 3/2009 | Borckschneider et al. | |
| 7,547,061 B2 | 6/2009 | Horimatsu et al. | |
| 7,549,707 B2 | 6/2009 | Brennan et al. | |
| 7,622,179 B2 | 11/2009 | Patel | |
| 7,625,629 B2 | 12/2009 | Takaoka | |
| 7,669,925 B2 | 3/2010 | Beck et al. | |
| 7,707,743 B2 | 5/2010 | Schindler et al. | |
| 7,771,375 B2 | 8/2010 | Nishibori et al. | |
| 7,837,263 B2 | 11/2010 | Booth et al. | |
| 7,866,969 B2 | 1/2011 | Ruiz et al. | |
| 7,892,991 B2 | 2/2011 | Yamanaka et al. | |
| D636,293 S | 4/2011 | Dolce et al. | |
| 7,946,649 B2 | 5/2011 | Galbreath et al. | |
| 7,993,734 B2 | 8/2011 | Takaoka | |
| 8,052,212 B2 | 11/2011 | Backendorf | |
| 8,056,263 B2 | 11/2011 | Schindler et al. | |
| 8,226,882 B2 | 7/2012 | Takaoka | |
| 8,235,462 B2 | 8/2012 | Bajic et al. | |
| 8,240,759 B2 | 8/2012 | Hobl et al. | |
| 8,276,235 B2 | 10/2012 | Naughton | |
| 8,277,210 B2 | 10/2012 | Takaoka | |
| D677,193 S | 3/2013 | MacDonald | |
| 8,563,121 B2 | 10/2013 | Takaoka | |
| 8,563,123 B2 | 10/2013 | Takaoka | |
| 8,568,635 B2 | 10/2013 | Takaoka | |
| 8,721,825 B2 | 5/2014 | Takaoka | |
| 8,752,902 B2 | 6/2014 | Labish | |
| 8,757,996 B2 | 6/2014 | Takaoka | |
| 8,828,293 B2 | 9/2014 | Takaoka | |
| 8,882,202 B2 | 11/2014 | Petzel et al. | |
| 8,932,692 B2 | 1/2015 | Pearce | |
| 9,004,591 B2 | 4/2015 | Murasaki et al. | |

(56) References Cited

U.S. PATENT DOCUMENTS

| | | | |
|---|---|---|---|
| 9,009,792 B1 | 4/2015 | Scofield et al. | |
| 9,027,220 B2 * | 5/2015 | Schlafhauser | B21J 15/025 |
| | | | 702/158 |
| 9,097,921 B2 | 8/2015 | Ogasawara | |
| 9,168,854 B2 | 10/2015 | Ursino et al. | |
| 9,169,585 B2 | 10/2015 | Takaoka | |
| 9,174,404 B2 | 11/2015 | Takaoka | |
| 9,179,748 B2 | 11/2015 | Esti | |
| 9,194,066 B2 | 11/2015 | Takaoka | |
| 9,283,875 B1 | 3/2016 | Pellettiere | |
| 9,334,593 B2 | 5/2016 | Sasaki | |
| 9,434,286 B2 | 9/2016 | Klusmeier et al. | |
| 9,440,390 B2 | 9/2016 | Takaoka | |
| 9,447,522 B2 | 9/2016 | Zikeli et al. | |
| 9,456,702 B2 | 10/2016 | Miyata et al. | |
| 9,487,117 B2 | 11/2016 | Steinmeier et al. | |
| 9,528,209 B2 | 12/2016 | Takaoka | |
| 9,561,612 B2 | 2/2017 | Takaoka | |
| 9,598,803 B2 | 3/2017 | Takaoka | |
| 9,615,670 B2 | 4/2017 | Takaoka | |
| 9,616,790 B2 | 4/2017 | Stankiewicz et al. | |
| 9,617,021 B2 | 4/2017 | McCorkle et al. | |
| 9,669,744 B2 | 6/2017 | Cao et al. | |
| 9,688,007 B2 | 6/2017 | Cheng | |
| 9,708,067 B2 | 7/2017 | Wilson et al. | |
| 9,751,442 B2 | 9/2017 | Smith | |
| 9,771,174 B2 | 9/2017 | Murray | |
| D798,875 S | 10/2017 | Huang | |
| 9,789,796 B1 | 10/2017 | White | |
| 9,918,559 B2 | 3/2018 | Osaki | |
| 9,918,560 B2 | 3/2018 | Osaki | |
| 9,925,899 B2 | 3/2018 | Mogi et al. | |
| 9,938,649 B2 | 4/2018 | Taninaka et al. | |
| 9,970,140 B2 | 5/2018 | Taninaka et al. | |
| 10,118,323 B2 | 11/2018 | Fujita et al. | |
| 10,150,320 B2 | 12/2018 | Ellringmann et al. | |
| 10,231,511 B2 | 3/2019 | Guyan et al. | |
| 10,233,073 B2 | 3/2019 | Takaoka | |
| 10,266,977 B2 | 4/2019 | Takaoka | |
| 10,316,444 B2 | 6/2019 | Wakui et al. | |
| 10,328,618 B2 | 6/2019 | Takaoka | |
| 10,343,565 B2 | 7/2019 | Baek et al. | |
| 10,398,236 B2 | 9/2019 | Achten et al. | |
| 10,399,848 B2 | 9/2019 | Kristo et al. | |
| 10,414,305 B2 | 9/2019 | Ishii et al. | |
| 10,421,414 B2 | 9/2019 | Townley et al. | |
| 10,457,175 B2 | 10/2019 | Lang et al. | |
| 10,501,598 B2 | 12/2019 | Baldwin et al. | |
| 10,604,040 B2 | 3/2020 | Clauser et al. | |
| 10,618,799 B2 | 4/2020 | Shah et al. | |
| 10,632,814 B2 | 4/2020 | Humer | |
| 10,730,419 B2 | 8/2020 | Low et al. | |
| 10,736,435 B2 | 8/2020 | Duncan et al. | |
| 10,744,914 B2 | 8/2020 | Baek et al. | |
| 10,750,820 B2 | 8/2020 | Guyan | |
| RE48,225 E | 9/2020 | Kheil et al. | |
| 10,780,805 B2 | 9/2020 | Kamata | |
| 10,806,272 B2 | 10/2020 | Ando et al. | |
| 10,821,862 B2 | 11/2020 | Russman et al. | |
| 10,843,600 B2 | 11/2020 | Booth et al. | |
| 10,882,444 B2 | 1/2021 | Townley et al. | |
| 10,889,071 B2 | 1/2021 | Kojima et al. | |
| D909,792 S | 2/2021 | Pound | |
| 10,934,644 B2 | 3/2021 | Taninaka et al. | |
| 11,007,761 B2 | 5/2021 | Ben-Daat et al. | |
| 11,168,421 B2 | 11/2021 | Wakui et al. | |
| 11,186,336 B2 | 11/2021 | Primeaux et al. | |
| D948,764 S | 4/2022 | Peterson | |
| 11,369,532 B2 | 6/2022 | Wilson et al. | |
| 11,383,625 B2 | 7/2022 | Voigt et al. | |
| 11,554,699 B2 | 1/2023 | Liau et al. | |
| D1,005,380 S | 11/2023 | McWilliams et al. | |
| 2002/0041949 A1 | 4/2002 | Nishibori et al. | |
| 2002/0101109 A1 | 8/2002 | Stiller et al. | |
| 2002/0193221 A1 | 12/2002 | Tisi | |
| 2003/0026970 A1 | 2/2003 | Hernandez et al. | |
| 2003/0032731 A1 | 2/2003 | Oswald et al. | |
| 2003/0061663 A1 | 4/2003 | Lampel | |
| 2003/0092335 A1 | 5/2003 | Takaoko | |
| 2004/0036326 A1 | 2/2004 | Bajic et al. | |
| 2004/0099981 A1 | 5/2004 | Gerking | |
| 2004/0126577 A1 | 7/2004 | Lee et al. | |
| 2004/0142619 A1 | 7/2004 | Ueno et al. | |
| 2004/0255385 A1 | 12/2004 | England | |
| 2005/0030011 A1 | 2/2005 | Shimizu et al. | |
| 2005/0066423 A1 | 3/2005 | Hogan | |
| 2005/0198874 A1 | 9/2005 | Wurm | |
| 2005/0238842 A1 | 10/2005 | Schindzielorz et al. | |
| 2006/0068120 A1 | 3/2006 | Sreenivasan et al. | |
| 2006/0075615 A1 | 4/2006 | Khambete | |
| 2006/0116045 A1 | 6/2006 | Nishibori et al. | |
| 2006/0141221 A1 | 6/2006 | Sasaki | |
| 2006/0198983 A1 | 9/2006 | Patel | |
| 2006/0237986 A1 | 10/2006 | Brockschneider et al. | |
| 2007/0001336 A1 | 1/2007 | Nishibori et al. | |
| 2007/0057414 A1 | 3/2007 | Hartge | |
| 2007/0066197 A1 | 3/2007 | Woo et al. | |
| 2007/0134464 A1 | 6/2007 | Schindzielorz et al. | |
| 2007/0207691 A1 | 9/2007 | Cobbett Wiles et al. | |
| 2008/0018162 A1 | 1/2008 | Galbreath et al. | |
| 2008/0048474 A1 | 2/2008 | Pedde et al. | |
| 2008/0099458 A1 | 5/2008 | Hilmer | |
| 2008/0102149 A1 | 5/2008 | Williams | |
| 2008/0203615 A1 | 8/2008 | Brum | |
| 2008/0252111 A1 | 10/2008 | Rothkop et al. | |
| 2008/0254281 A1 | 10/2008 | Chen et al. | |
| 2008/0309143 A1 | 12/2008 | Booth et al. | |
| 2009/0008377 A1 | 1/2009 | Nathan et al. | |
| 2009/0085384 A1 | 4/2009 | Galbreath et al. | |
| 2009/0108494 A1 | 4/2009 | Ito et al. | |
| 2009/0127912 A1 | 5/2009 | Galbreath et al. | |
| 2009/0152909 A1 | 6/2009 | Andersson | |
| 2009/0191395 A1 | 7/2009 | Noelle et al. | |
| 2009/0191779 A1 | 7/2009 | Cree | |
| 2009/0269570 A1 | 10/2009 | Takaoka | |
| 2009/0269571 A1 | 10/2009 | Takaoka | |
| 2009/0311495 A1 | 12/2009 | Squires et al. | |
| 2010/0181796 A1 | 7/2010 | Galbreath et al. | |
| 2010/0258334 A1 | 10/2010 | Akaike et al. | |
| 2011/0252568 A1 | 10/2011 | Ramp | |
| 2011/0278902 A1 | 11/2011 | Galbreath et al. | |
| 2011/0316185 A1 | 12/2011 | Takaoka | |
| 2012/0042452 A1 | 2/2012 | Takaoka | |
| 2012/0104646 A1 | 5/2012 | Takaoka | |
| 2012/0112515 A1 | 5/2012 | Labish | |
| 2012/0174352 A1 | 7/2012 | Tsunoda | |
| 2012/0180939 A1 | 7/2012 | Takaoka | |
| 2012/0181841 A1 | 7/2012 | Petzel et al. | |
| 2012/0235461 A1 | 9/2012 | Rosenbrock et al. | |
| 2012/0301701 A1 | 11/2012 | Takaoka | |
| 2012/0319323 A1 | 12/2012 | Takaoka | |
| 2012/0328722 A1 | 12/2012 | Takaoka | |
| 2013/0000043 A1 | 1/2013 | Bullard et al. | |
| 2013/0020016 A1 | 1/2013 | Takaoka | |
| 2013/0137330 A1 | 5/2013 | Grimm | |
| 2013/0161858 A1 | 6/2013 | Sasaki | |
| 2013/0164123 A1 | 6/2013 | Helmenstein | |
| 2013/0189472 A1 | 7/2013 | Takaoka | |
| 2013/0200661 A1 | 8/2013 | Klusmeier et al. | |
| 2014/0029900 A1 | 1/2014 | Logan, Jr. et al. | |
| 2014/0035191 A1 | 2/2014 | Takaoka et al. | |
| 2014/0037907 A1 | 2/2014 | Takaoka | |
| 2014/0037908 A1 | 2/2014 | Takaoka | |
| 2014/0042792 A1 | 2/2014 | Kajiwara | |
| 2014/0062161 A1 | 3/2014 | Elenbaas et al. | |
| 2014/0138016 A1 | 5/2014 | Takaoka | |
| 2014/0167328 A1 | 6/2014 | Petzel | |
| 2014/0354029 A1 | 12/2014 | Takaoka | |
| 2014/0370769 A1 | 12/2014 | Osaki | |
| 2014/0378015 A1 | 12/2014 | Osaki | |
| 2015/0072107 A1 | 3/2015 | Fujita et al. | |
| 2015/0091209 A1 | 4/2015 | Mueller et al. | |
| 2015/0183349 A1 | 7/2015 | Oberle et al. | |
| 2015/0197056 A1 | 7/2015 | Takaoka | |

(56) References Cited

U.S. PATENT DOCUMENTS

| | | |
|---|---|---|
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052066 A1 | 2/2016 | Chou et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0280106 A1 | 9/2016 | Sato et al. |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0126445 A1* | 5/2018 | Wang .................... B29C 66/41 |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0193221 A1 | 6/2020 | Aftab et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0129208 A1* | 5/2021 | Laberge Lebel ......... B21J 15/04 |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322135 A1 | 10/2023 | Hallock et al. |
| 2023/0322136 A1 | 10/2023 | Wang et al. |
| 2024/0010108 A1 | 1/2024 | Hallock et al. |
| 2024/0066824 A1 | 2/2024 | Cluet et al. |
| 2024/0133078 A1 | 4/2024 | Hirano et al. |
| 2024/0261849 A1* | 8/2024 | Badent .................... B21D 37/16 |
| 2024/0316873 A1* | 9/2024 | Haruna .................... F16B 5/04 |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 102011686 A | 4/2011 |
| CN | 202509164 U | 10/2012 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 104582538 B | 9/2016 |
| CN | 104080959 B | 2/2017 |
| CN | 106387295 A | 2/2017 |
| CN | 106458070 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109680413 A | 4/2019 |
| CN | 107614238 B | 2/2020 |
| CN | 111038431 A | 4/2020 |
| CN | 107208339 B | 6/2020 |
| CN | 107532357 B | 8/2020 |
| CN | 106231959 B | 10/2020 |
| CN | 111989430 A | 11/2020 |
| CN | 112020578 A | 12/2020 |
| CN | 107708493 B | 1/2021 |
| CN | 112192846 A | 1/2021 |
| CN | 107208340 B | 2/2021 |
| CN | 109552123 A | 7/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 117043246 A | 11/2023 |
| DE | 2240769 A1 | 3/1973 |
| DE | 2534054 A1 | 2/1976 |
| DE | 2626748 A1 | 2/1979 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 3920529 C1 | 8/1990 |
| DE | 4214389 A1 | 11/1993 |
| DE | 29822649 U1 | 4/1999 |
| DE | 102004053133 A1 | 5/2006 |
| DE | 202006017670 U1 | 7/2007 |
| DE | 102006020306 A1 | 11/2007 |
| DE | 102007027496 A1 | 1/2008 |
| DE | 102008033468 A1 | 2/2009 |

(56) References Cited

FOREIGN PATENT DOCUMENTS

| | | | |
|---|---|---|---|
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102020127913 A1 | 6/2021 |
| DE | 102022107559 A1 | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370027 A1 | 2/2024 |
| DK | 202370420 A1 | 8/2024 |
| DK | 202370426 A1 | 8/2024 |
| EP | 0240388 A2 | 10/1987 |
| EP | 0145603 B1 | 4/1988 |
| EP | 0370991 A2 | 5/1990 |
| EP | 0392568 A1 | 10/1990 |
| EP | 805064 A1 | 11/1997 |
| EP | 0805064 A2 | 11/1997 |
| EP | 0890430 A2 | 1/1999 |
| EP | 0894885 A2 | 2/1999 |
| EP | 0926302 A2 | 6/1999 |
| EP | 0894885 B1 | 11/2002 |
| EP | 1586687 A1 | 10/2005 |
| EP | 1082480 B1 | 9/2009 |
| EP | 1270787 B1 | 6/2010 |
| EP | 2230132 A1 | 9/2010 |
| EP | 1858944 B1 | 7/2011 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| EP | 4461166 A1 | 11/2024 |
| ES | 2335962 A1 | 4/2010 |
| ES | 2335962 B1 | 4/2010 |
| ES | 2346180 T3 | 10/2010 |
| ES | 2715028 T3 | 5/2019 |
| FR | 2432108 A1 | 2/1980 |
| FR | 2486922 A3 | 1/1982 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 721866 A | 1/1955 |
| GB | 1009799 A | 10/1964 |
| GB | 2275695 A | 9/1994 |
| GB | 2576141 A | 2/2020 |
| GB | 2577591 B | 4/2021 |
| GB | 2589497 B | 11/2021 |
| GB | 2607058 A | 11/2022 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S52105392 A | 9/1977 |
| JP | S556515 A | 1/1980 |
| JP | S5517527 A | 5/1980 |
| JP | H04286627 A | 10/1992 |
| JP | H0861414 A | 3/1996 |
| JP | H1046185 A | 2/1998 |
| JP | H10128890 A | 5/1998 |
| JP | H10248685 A | 9/1998 |
| JP | H115282 A | 1/1999 |
| JP | H1148275 A | 2/1999 |
| JP | H11123757 A | 5/1999 |
| JP | H11350326 A | 12/1999 |
| JP | 2000004993 A | 1/2000 |
| JP | 2000509335 A | 7/2000 |
| JP | 2000248455 A | 9/2000 |
| JP | 2001046185 A | 2/2001 |
| JP | 2001055719 A | 2/2001 |
| JP | 2001061607 A | 3/2001 |
| JP | 2001061612 A | 3/2001 |
| JP | 2001070106 A | 3/2001 |
| JP | 2001310378 A | 11/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003012905 A | 1/2003 |
| JP | 2003250667 A | 9/2003 |
| JP | 2003251089 A | 9/2003 |
| JP | 2003268668 A | 9/2003 |
| JP | 2004202858 A | 7/2004 |
| JP | 3589307 A | 11/2004 |
| JP | 3686690 B2 | 8/2005 |
| JP | 3686692 B2 | 8/2005 |
| JP | 2006006924 A | 1/2006 |
| JP | 2006200117 A | 8/2006 |
| JP | 2006200119 A | 8/2006 |
| JP | 2006200120 A | 8/2006 |
| JP | 2007098013 A | 4/2007 |
| JP | 4181878 B2 | 11/2008 |
| JP | 2009090089 A | 4/2009 |
| JP | 4347647 B2 | 10/2009 |
| JP | 4350285 B2 | 10/2009 |
| JP | 4350286 B2 | 10/2009 |
| JP | 4350287 B2 | 10/2009 |
| JP | 2010524569 A | 7/2010 |
| JP | 2011045424 A | 3/2011 |
| JP | 2011152779 A | 3/2011 |
| JP | 2011177413 A | 9/2011 |
| JP | 4835150 B2 | 12/2011 |
| JP | 4907991 B2 | 4/2012 |
| JP | 2012115515 A | 6/2012 |
| JP | 2012171360 A | 9/2012 |
| JP | 5165809 B1 | 3/2013 |
| JP | 2013091862 A | 5/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015119825 A | 7/2015 |
| JP | 2015205611 A | 11/2015 |
| JP | 5868964 B2 | 2/2016 |
| JP | 2016028900 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 2016036972 A | 4/2017 |

(56) References Cited

FOREIGN PATENT DOCUMENTS

| | | |
|---|---|---|
| JP | 6182249 B2 | 8/2017 |
| JP | 2017150100 A | 8/2017 |
| JP | 6228278 B2 | 11/2017 |
| JP | 2017226230 A | 12/2017 |
| JP | 2018500990 A | 1/2018 |
| JP | 2018027163 A | 2/2018 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 2020127523 A | 2/2019 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020156629 A | 10/2020 |
| JP | 6786500 B2 | 11/2020 |
| JP | 2020192164 A | 12/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 20090035561 A | 4/2009 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 101756629 B1 | 7/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| KR | 20220034241 A | 3/2022 |
| NL | 1032699 C2 | 4/2008 |
| SE | 524231 C2 | 7/2004 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A | 2/2004 |
| WO | 2004063450 A1 | 7/2004 |
| WO | 2005030011 A1 | 4/2005 |
| WO | 2006068120 A1 | 6/2006 |
| WO | 2008016770 A1 | 2/2008 |
| WO | 2009092153 A1 | 7/2009 |
| WO | 2010048515 A1 | 4/2010 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2012167950 A1 | 12/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014075198 A1 | 5/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015125497 A1 | 8/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2017199474 A1 | 11/2017 |
| WO | 2018068451 A1 | 4/2018 |
| WO | 2018172385 A1 | 9/2018 |
| WO | 2019036559 A1 | 2/2019 |
| WO | 2019166691 A1 | 9/2019 |
| WO | 2019188090 A1 | 10/2019 |
| WO | 2019230304 A1 | 12/2019 |
| WO | 2020021263 A1 | 1/2020 |
| WO | 2020045589 A1 | 3/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2022097435 A1 | 5/2022 |
| WO | 2023071240 A1 | 5/2023 |
| WO | 2023101995 A2 | 6/2023 |
| WO | 2023122018 A2 | 6/2023 |
| WO | 2023132308 A1 | 7/2023 |
| WO | 2023172483 A1 | 9/2023 |
| WO | 2023204905 A1 | 10/2023 |
| WO | 2024136943 A1 | 10/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |

OTHER PUBLICATIONS https://www.toyobo-global.com/seihin/breathair/breathair_youto.htm, Applications, Sep. 10, 2019, 5 pages.

https://www.toyobo-global.com/seihin/breathair_youto_htm, Toyobo Breathair, Cushion Materials, 1996-2013, 3 pages.

https://www.youtube.com/watch?v=eFiPBu_fBe4, The Making of a Newton Wovenaire Crib Mattress—YouTube, 3 Pages, Apr. 21, 2016.

Www.newtonbaby.com pages design, Borninwater, designed to breathe, Jan. 28, 2021, 11 pages.

http://airstring.com, Introducing Airstring The Future of Cushioning, 2016, 13 pages.

International Searching Authority; Invitation to Pay Additional Fees and Where Applicable, Protest Fees, PCTUS2023/021869, mailed Jul. 14, 2023, 4 pages.

https://www.youtube.com/watch2v=eFiPBu fBe4, The Making of a Newton Wovenaire Crib Mattress, Apr. 21, 2016, 3 pages.

* cited by examiner

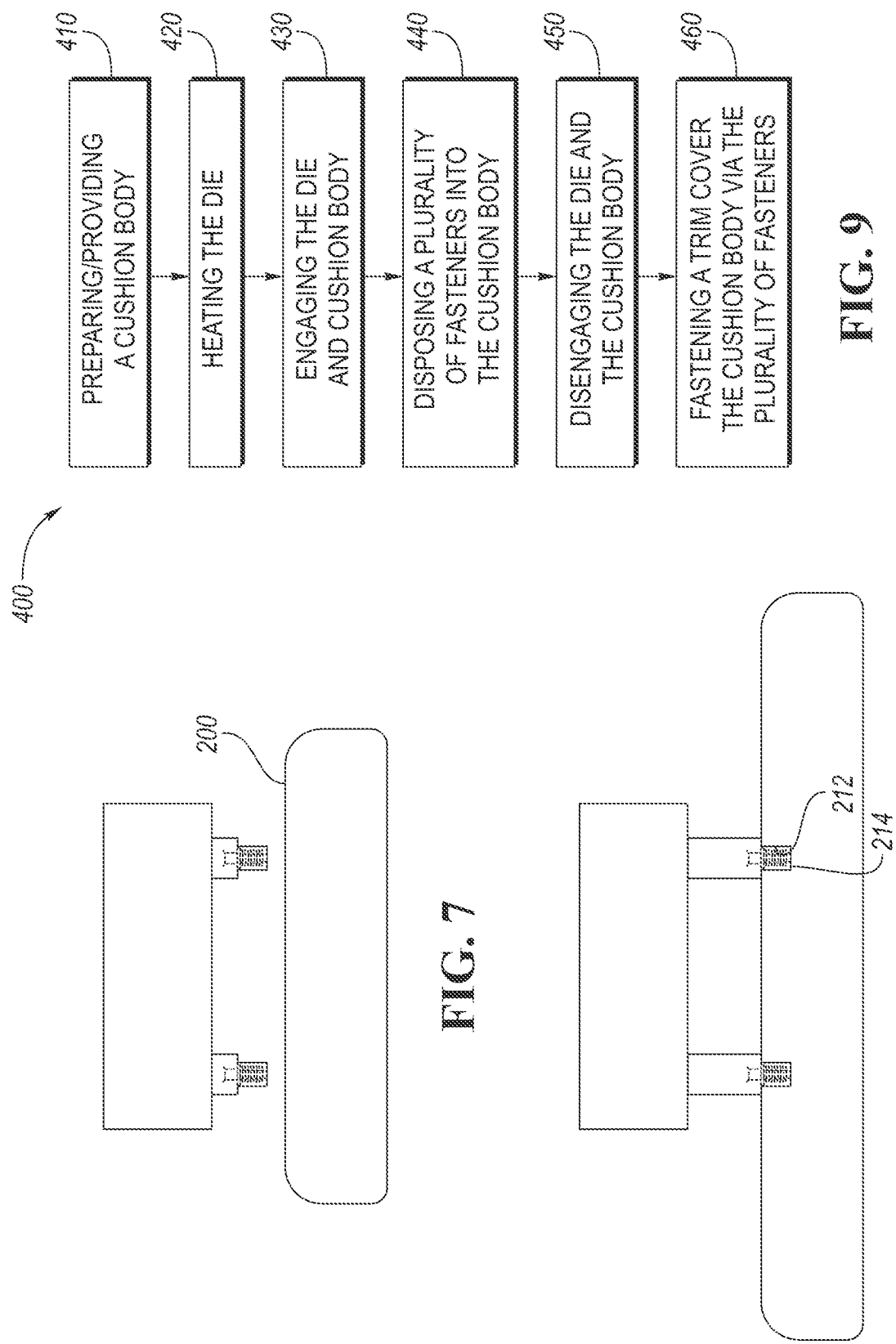

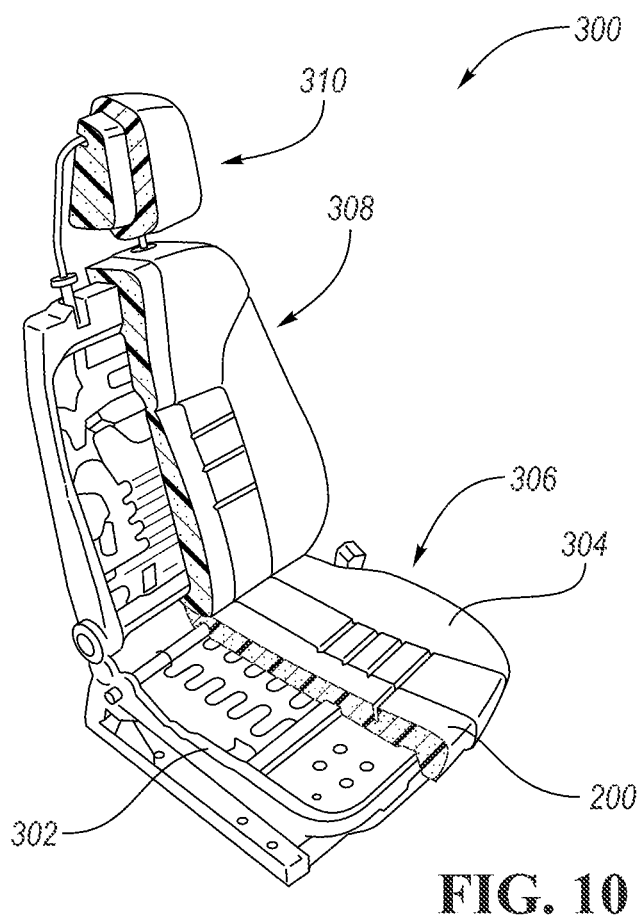
FIG. 10
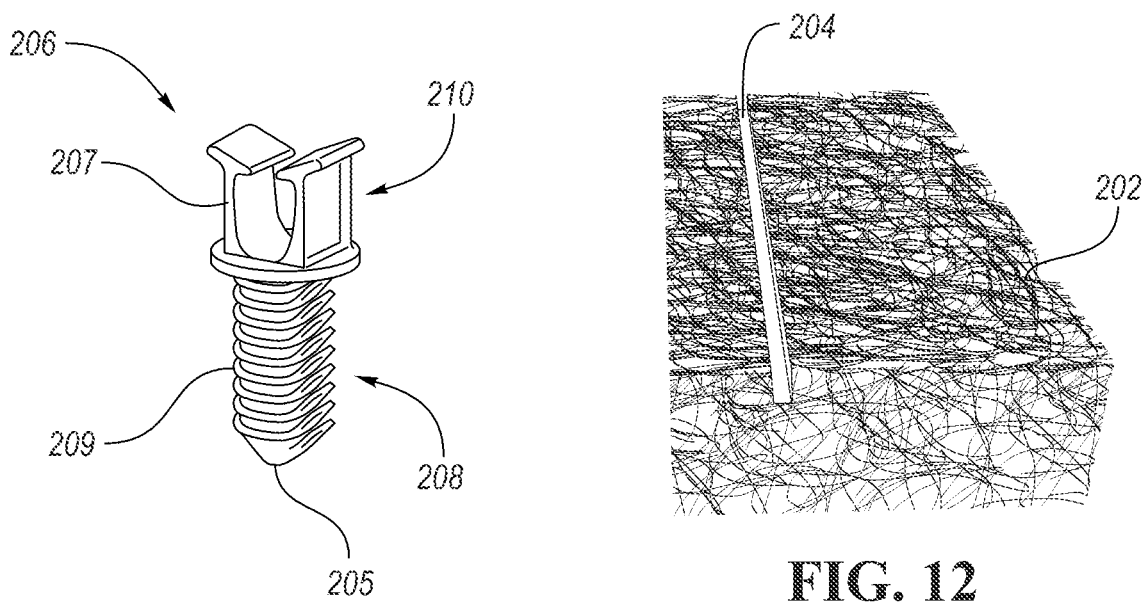
FIG. 11
FIG. 12

AUTOMATED TRENCH MANUFACTURING AND ASSEMBLY FOR ATTACHING TRIM COVERS TO A CUSHION ASSEMBLY

TECHNICAL FIELD

Foamless cushion assemblies with trenches (i.e., cavities, channels, or depressions) and fasteners disposed therein are disclosed. Method and assemblies for making the same are also disclosed.

BRIEF DESCRIPTION OF THE DRAWINGS

FIG. 7 is front view of the cushion and cushion assembly before engagement.

FIG. 8 is a front view of the cushion and cushion assembly during engagement.

FIG. 9 is a flow chart illustrating a method of making a cushion assembly.

FIG. 10 is a partial cross-section perspective view of a seat assembly.

FIG. 11 is a perspective view of an embodiment of a fastener.

FIG. 12. is a perspective view of a foamless cushion having a trench therein.

DETAILED DESCRIPTION

Figure 1:
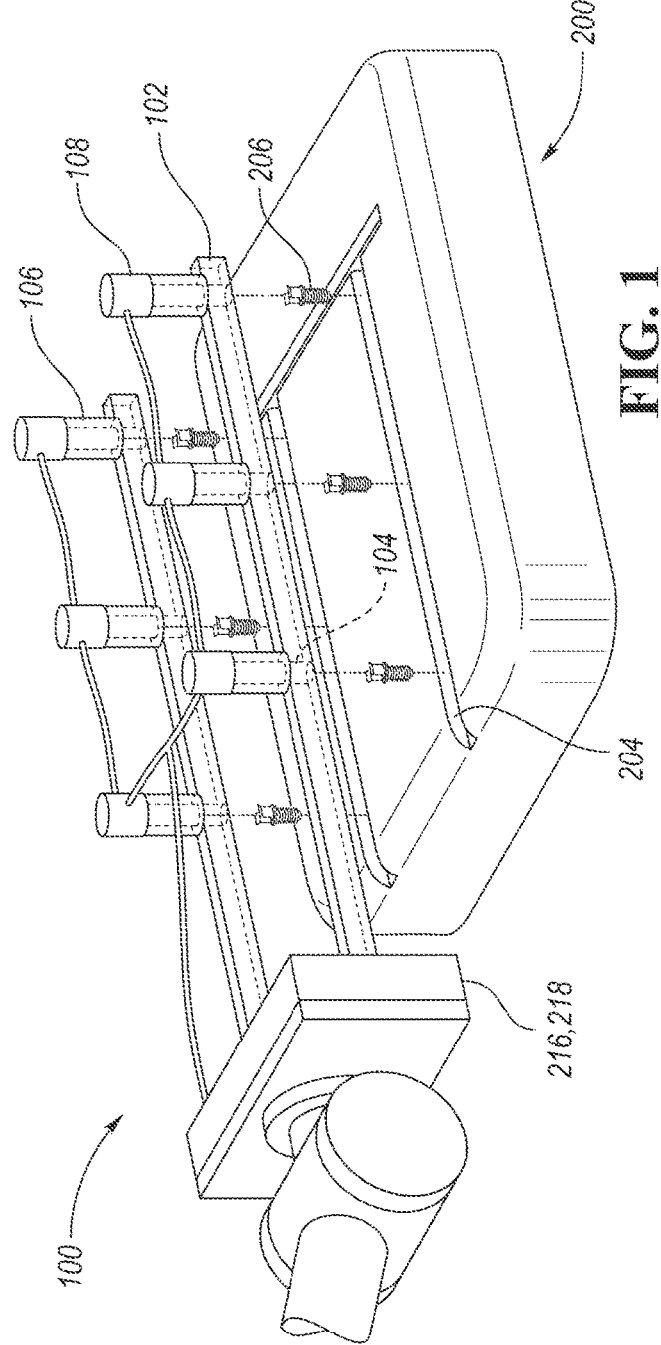
FIG. 1 is a perspective view of a cushion assembly and a manufacturing assembly for making the same.
Figure 3:
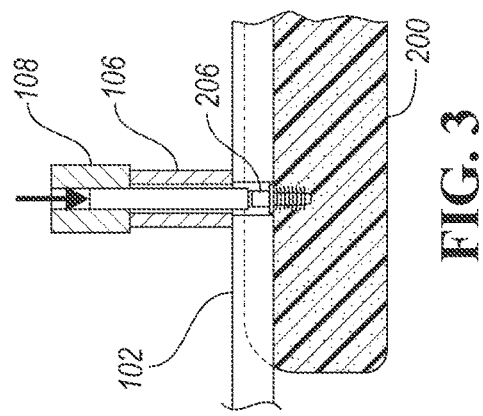
FIG. 3 is a partial cross-sectional view of the manufacturing assembly engaging a cushion after actuation.
Figure 2:
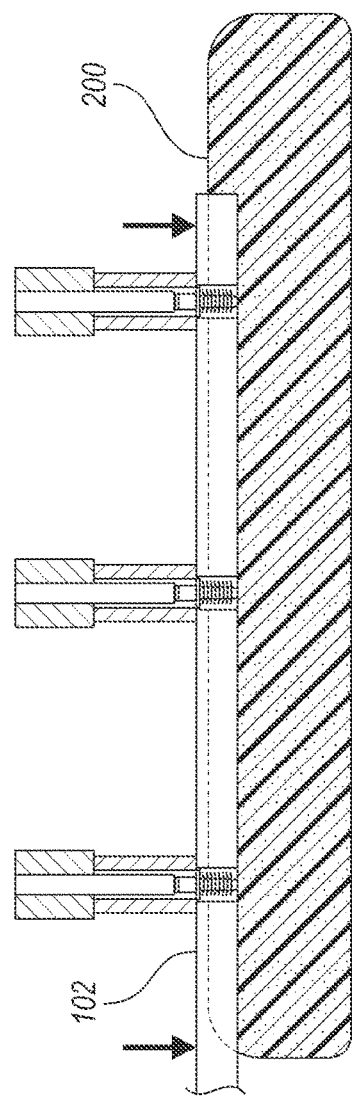
FIG. 2 is a partial cross-sectional view of the manufacturing assembly engaging a cushion before actuation.
Figure 4:
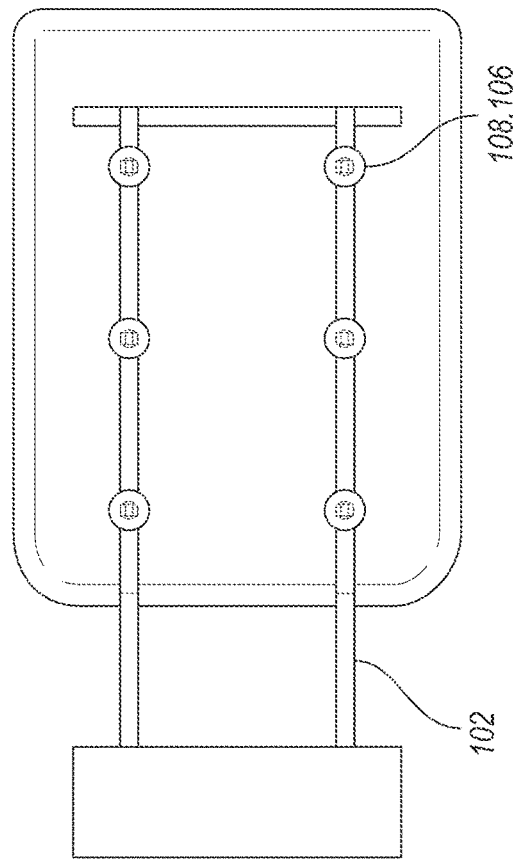
FIG. 4 is a top view of the manufacturing assembly engaging a cushion assembly.
Figure 5:
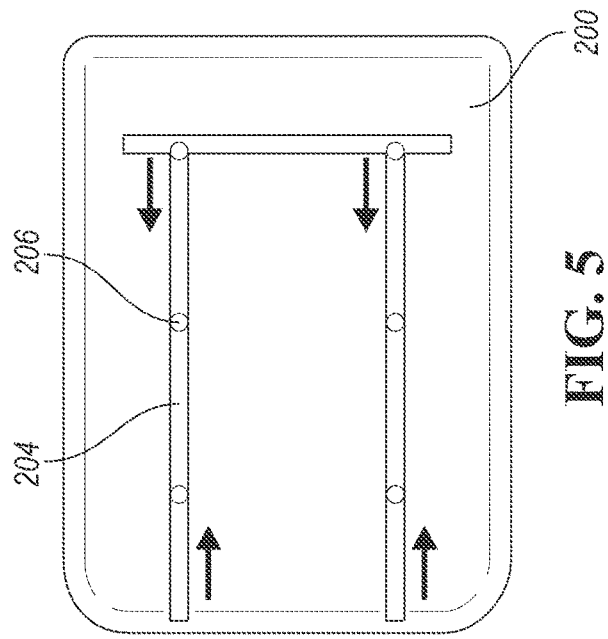
FIG. 5 is a top view of the cushion of FIG. 4 after engagement by the manufacturing assembly.
Figure 6:
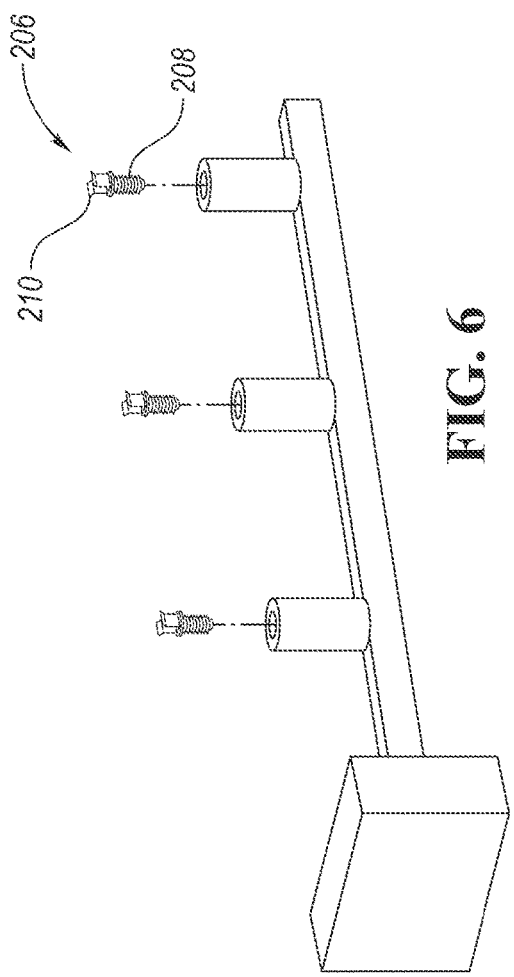
FIG. 6 is an exploded view of a portion of the manufacturing assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight. The term "polymer" includes "oligomer," "copolymer," "terpolymer," and the like. The description of a group or class of materials as suitable or preferred for given purpose implies the mixtures of any two or more of the members of the group or class are equally suitable or preferred. Molecular weights provided for any polymers refers to number average molecular weight. A description of constituents in chemical terms refers to the constituents at the time of addition to any combination specified in the description and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

The term "substantially" or "generally" may be used herein to describe disclosed or claimed embodiments. The term "substantially" or "generally" may modify a value or relative characteristic disclosed or claimed in the present disclosure. In such instances, "substantially" or "generally" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Referring to FIG. 1, a manufacturing assembly 100 to produce a molded assembly such as a cushion assembly 200 is disclosed. In a refinement, the cushion assembly 200 is disposed in a seat assembly 300, as shown in FIG. 10. For example, the seat assembly 300 is for a vehicle (e.g., motorcycle, automobile, locomotive, aircraft, and/or watercraft). The manufacturing assembly 100 includes a die 102 having one or more orifices 104 with corresponding receptacle(s) 106 and/or actuator(s) 108 disposed therewith. The cushion assembly 200 comprises a cushion 202 such as a foam or foamless cushion. In a refinement, the cushion 202 is foamless, i.e., includes a body made up of a plurality of entangled and/or intertwined polymeric strands such that it is foamless, as shown in FIG. 12. In a variation, the manufacturing assembly is used to define one or more trenches 204 (e.g., a plurality, two, three, four, etc.) in the cushion 202 and to dispose one or more fasteners 206 (e.g., a plurality, two, three, four, etc.) in each trench 204 (i.e., depressed channel) of the cushion 202. The fasteners 206, for example, cooperate with a trim cover 304 to secure the trim cover 304 to the cushion assembly 200. In a variation, the one or more trenches 204 extend along the cushion such that when arranged in a vehicle seat they extend from the seat front towards the seat back.

Referring to FIG. 10, the seat assembly 300 includes a seat frame 302 supporting the cushion assembly 200 and a trim cover 304 disposed over the cushion assembly 200. In a variation, the seat assembly 300 includes a seat bottom 306, a seat back 308, and a head rest 310. In a refinement, the trim cover 304 cooperates with the cushion assembly 200 via the one or more fasteners 206. For example, in various embodiments, the fasteners 206 have a penetrating portion 208 and a cooperating portion 210, as shown in FIG. 11. In a refinement, the penetrating portion 208 has a tapered tip such as a pointed tip 205 and one or more retaining elements 209 such as barbs, or flat ridges that extend along the periphery. In various embodiments, the cooperating portion 210 includes a clip 207 to attach the fastener 206 to the trim cover 304. In a variation, the trim cover 304 has corresponding fasteners 206 that cooperate with the fasteners 206 of the cushion assembly 200. For example, the fasteners of the trim cover 304 snap into the clips 207 of the fasteners 206 disposed in the cushion assembly 200.

In various embodiments, the cushions 202 are free of foam or foamless. For example, the cushions 202 are made of a body of entangled or intertwined polymeric strands/filaments such as those discussed in the U.S. patent application identified by Ser. No. 17/741,639 and filed May 11, 2022, which is hereby incorporated by reference in its entirety. In a refinement, the trenches 204 of the foamless cushion are delimited by a lateral wall 212 and a floor portion 214 that have skinned over (i.e., the individual strands have deformed such as from pressure and heat) to form a membrane (i.e., lateral wall membrane and floor membrane). In various embodiments, the membrane has a minimum thickness of at least 1.75 mm, or more preferably at least 2.0 mm, or even more preferably at least 2.25 mm such that it sufficiently retains the one or more fasteners 206. In one or more embodiments, the fasteners 206 are Christmas tree fasteners with a clip 207 at the end such that they cannot be retained in the foamless cushion unless a skinned over membrane is formed. In still other embodiments, the thickness proximate the one or more fasteners 206 is at least 1.75 mm, or more preferably at least 2.0 mm, or even more preferably at least 2.25 mm. In a refinement, the fasteners 206 are made of a material having a low melting and/or softening point (e.g., less than 150° C., or more preferably less than 250° C., or even more preferably less than 350° C.) such as plastic (e.g., polyethylene, polypropylene, polystyrene, polyurethane, polyvinyl chloride, polyacrylates, acrylics, polyolefins).

In one or more embodiments, a manufacturing assembly or system 100 includes a die 102 such as one or more die bars to define one or more trenches 204 in the cushion 202, receptacles 106 (to receive the fasteners 206 before they are disposed in the cushion 202) cooperating with the die 102, and one or more actuators 108 cooperating with the receptacles 106 and/or fasteners 206 to dispose them into the cushion 202. In a refinement, the manufacturing assembly or system 100 includes a heating element 216 in communication with the die 102 such that the die 102 may be heated during operation. In a refinement, the die 102 is heated to or above a threshold temperature. In various embodiments, an ultrasonic heater is used. For example, the die 102 is heated to at least 100° C., or more preferably at least 105° C., or even more preferably at least 110° C. In various embodiments, the die includes a thermal conductor such as metal (e.g., steel, aluminum, iron, or copper). In a refinement, the die 102 has a thermal conductivity of at least 25 W/m·K, or more preferably at least 50 W/m·K, or even more preferably at least 100 W/m·K. In yet another embodiment, the manufacturing assembly 100 includes an adaptor such as an adaptor plate to attach the manufacturing assembly 100 as an end effector to an automation system. For example, the manufacturing assembly 100 cooperates with the automation system. The manufacturing assembly 100, for example, cooperates with one or more robotic arm 218 to move the die 102 such that it engages the cushion 202 and disengages the cushion 202. In a variation, the robotic arm 218 applies the die 102 to the cushion 202 at a pressure of at least 60N, or more preferably at least 75N, or even more preferably at least 80N. In various embodiments, the heat and/or pressure defines the one or more trenches 204 such as by deforming, molding, cutting, and/or carving the cushion 202.

In various embodiments, the die 102 includes one or more orifices 104 extending from a first side to a second side of the die 102 and sized such that the fastener(s) 206 may pass through the die 102. In a refinement, a receptacle 106 is disposed over and/or aligned with each orifice 104 such that the receptacle 106 may receive and hold a fastener 206 until it is disposed in the cushion 202. The one or more receptacles 106 cooperate with the die 102. For example, the receptacles 106 are attached or fixed to the die 102 such as by an adhesive or fastener. In a variation, the receptacle 106 is a hollow jacket sized to house the fastener 206. For example, the receptacle 106 is cylindrical. In various embodiments, the hollow jacket is insulated such that it protects the fastener 206 from heat of the heated die 102. For example, the hollow jacket includes a thermal insulator such as a ceramic, plastics, mineral wool, fiberglass, polystyrene, cellulose, and/or polyurethane foams. In a refinement, the hollow jacket has a thermal conductivity of not more than 10 W/m·K, or more preferably not more than 1 W/m·K, or even more preferably not more than 0.1 W/m·K.

In various embodiments, the receptacles 106 cooperate with one or more actuators 108. The one or more actuators 108 are arranged such that during actuation the fastener 206 is displaced into the cushion 202 and retained in the cushion 202. For example, an actuator 108 such as a solenoid actuator is disposed adjacent each receptacle 106 opposite the orifice 104. In a refinement, each actuator 108 includes a piston that protrudes from the actuator 108. The actuators 108 are arranged such that the pistons drive the fasteners 206 from the receptacles 106, through the orifices 104 and into the cushion 202 such that when the robotic arm 218 disengages the die 102 from the cushion 202 the one or more fasteners 206 are disposed in the trench 204 and retained in the cushion 202.

In one or more embodiments, the automation system is in communication with a controller (not shown) having a non-transitory computer readable medium having computer executable instructions thereon. In a variation, the controller also includes a processor. In various embodiments, the controller controls automation. For example, the controller is programmed to heat the die 102 and engage/disengage the die 102 with the one or more cushions 202. In a refinement, the die 102 is heated to a threshold temperature before its engaged with a cushion 202. In some embodiments, the controller is programmed to engage/disengage the die with a plurality or series of cushions. While engaged with the cushion, in one or more embodiment, the controller also actuates the one or more actuators 108 such that the one or more fasteners 206 is disposed in the cushion. In a refinement, a plurality or series of fasteners is disposed in a corresponding plurality or series of cushions. In still other embodiments, a cartridge or hopper of fasteners is in communication with the one or more receptacles 106 such that the one or more fasteners are feed to the receptacles for each cushion.

Methods of preparing cushions with fasteners disposed therein are also disclosed. In one or more embodiments, the method includes preparing and/or providing a cushion body (i.e., step 410), heating a die (i.e., step 420), engaging the die with the first cushion body (i.e., step 430), disposing a plurality of fasteners into the cushion body (i.e., step 440), disengaging the cushion body (i.e., step 450), and fastening a trim cover to the cushion (i.e., step 460). In various embodiments, the method is repeated for a plurality or series of cushion bodies (e.g., a first cushion body, a second cushion body, a third cushion body and so on). In a refinement, the die includes one or more die bars (e.g., a plurality of die bars) and each die bar includes a plurality of orifices extending through the die from a first side to a second side (e.g., from the top to the bottom).

In one or more embodiments, the cushion body is foamless such as being made from a plurality of entangled and/or intertwined polymeric strands/filaments as described above and in U.S. patent application identified by Ser. No. 17/741,639. In a variation, the foamless cushion body is produced from extruding a resin through an extrusion die having a plurality of apertures such that a plurality molten polymeric strands are formed. The polymeric strands are then dispensed from a first medium such as air through a funnel and into a second medium such as water such that they become entangled and intertwined into a body of polymeric strands.

In a variation, the die bar is heated by a heating element. For example, ultrasonic heating is used to heat the die and once the die achieves a temperature of at least 100° C., or more preferably at least 105° C. or even more preferably at least 110° C. it is engaged with the cushion body. In various embodiments, during engagement, the die is applied at a pressure/force 60N, or more preferably 75N, or even more preferably 80N such that it defines a number of trenches/channels corresponding to the number of die bars. In one or more embodiments, the die bar is engaged with the cushion body for at least 10 seconds, or more preferably at least 12 seconds, or even more preferably at least 15 seconds. In a variation, the die is engaged with the cushion body by a robotic arm that is responsible for heating the die and applying it to the cushion at the appropriate pressure/force and in the correct position.

In various embodiments, the plurality of fasteners is disposed in the corresponding trenches/channels of the cushion body. In a refinement, the plurality of fasteners is discharged from a receptacle such as a hollow jacket with insulating properties through the die into the cushion body while the die is engaging the cushion body. For example, the fasteners are discharged by one or more corresponding solenoid actuators. After the fasteners are discharged and driven into the cushion body, the die is disengaged from the cushion body such that the plurality of fasteners remains at least partially disposed in the cushion body. In a refinement, the robotic arm disengages the die (e.g., die bars) from the cushion body.

In one or more embodiments, a controller is programmed to execute computer readable instruction such that it actuates the robotic arm to heat, engage, and disengage the die. The instructions also actuate the actuators such that the plurality of fasteners is discharged into the cushion body. In various embodiments, the controller automates the methods such that multiple cushions may be shaped and prepared correctly and efficiently with little or no human labor. In a variation, a trim cover cooperates with the plurality of fasteners. For example, a trim cover may be attached/fastened to the cushion body via the plurality of fasteners.

In one or more embodiments, the processor includes one or more devices selected from high-performance computing systems including high-performance cores, microprocessors, micro-controllers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory. In variations, the memory includes a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. In a refinement, the non-volatile memory/storage includes one or more persistent data storage devices such as a hard drive, optical drive, tape drive, non-volatile solid state device, cloud storage or any other device capable of persistently storing information.

In one or more embodiment, the executable code/instructions may reside in a software module. In a refinement, the software module includes operating systems and applications. In various embodiments, the software module is compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL. Non-volatile storage may also include data supporting the functions, features, calculations, and processes.

In some embodiments, the systems described above include computer readable storage media, which is inherently non-transitory, and in various refinements includes volatile or non-volatile, and removable and non-removeable tangible media implemented in any method or technology for storage of information, such as computer-readable instructions, data structures, program modules, or other data. In a variation, computer readable storage media further includes RAM, ROM, erasable programable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. In various embodiments, the computer readable program instructions may be downloaded to a computer, another type of programmable data processing apparatus, or another device form of a computer readable storage medium or to an external computer or external storage device via a network.

In one or more embodiments, the computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

According to a first aspect of the method described herein, the method includes heating a die (e.g., die bars) defining a plurality of orifices, engaging the die with a first cushion to define a channel in the first cushion, driving a plurality of fasteners from a plurality of hollow jackets cooperating with the die through the plurality of orifices into the first cushion with one or more actuators that cooperate with the receptacles, and disengaging the die from the first cushion such that the plurality of fasteners remain disposed in the first cushion such as in the channel.

According to a second aspect, the die and first cushion of the first aspect or any of the following aspects are engaged by a robotic arm.

According to a third aspect, the method of any of the prior or following aspects wherein the steps are embodied as computer executable instructions on a non-transitory computer readable medium and executed by a processor cooperating with the robotic arm, die, a heating element, and the one or more actuators.

According to a fourth aspect, the method of any of the prior or following aspects includes fastening a trim cover to the first cushion via the plurality of fasteners.

According to a fifth aspect, the method of any of the prior or following aspects includes engaging a second cushion with the die to define a channel in the second cushion, driving a second plurality of fasteners from the plurality of hollow jackets through the plurality of orifices into the second cushion with the one or more actuators, and disengaging the die from the second cushion such that the second plurality of fasteners remains disposed in the channel of the second cushion.

According to a sixth aspect of the assembly described herein, the assembly includes a die (e.g., die bar) to define a cavity (e.g., trench/channel) in a cushion, a receptacle cooperating with the die and aligned with the orifice, and a actuator to drive the fastener from the receptacle, through the orifice, and into the cushion such that the fastener is disposed in the cavity of the cushion. The die includes an orifice that extends from a first side of the die to a second side. The receptacle is disposed on the die such that it receives a fastener. The fastener includes a clip to attach it to a trim assembly. The actuator is a solenoid actuator.

According to a seventh aspect, the die of any of the preceding or following aspects cooperates with a heating element to heat the die.

According to an eighth aspect, the receptacle of any of the preceding or following aspects is insulated or includes a thermal insulator to reduce the heat received from the die to the fastener such that it is not melted or deformed via thermal energy.

According to a nineth aspect, the heating element of any of the preceding or following aspects includes ultrasonic heating.

According to a tenth aspect, the assembly of any of the preceding or following aspects includes an adaptor such as an adaptor plate to install it as an end effector on an automation assembly.

According to an eleventh aspect, the actuator of any of the preceding or following aspects is a solenoid actuator.

According to a twelfth aspect, the fastener(s) of any of the preceding or following aspects cooperates with a trim cover to fasten the trim cover to the cushion.

According to a thirteenth aspect, the assembly of any of the preceding or following aspects cooperates with an automation system for engaging the die with the cushion to define the cavity.

According to a fourteenth aspect of the system disclosed herein, system includes one or more robotic arms, a plurality of die bars defining a plurality of orifices, a plurality of hollow jackets cooperating with the die bar to receive a plurality of fasteners, and an actuator arranged to drive the plurality of fasteners from the plurality of hollow jackets into the cushion assembly. The plurality of die bars is disposed on the one or more robotic arms such that when the plurality of die bars is heated and engages a cushion assembly the die bars define depressed channels in the cushion assembly. The plurality of hollow jackets is aligned with a respective orifices of the plurality of orifices such that a respective fastener of the plurality of fasteners is also aligned with the respective orifice. The actuator is arranged such that it drives each fastener from the hollow jacket through the respective orifice of the die bars into a depressed channel of the cushion.

According to a fifteenth aspect of the system of any of the preceding or following aspects, the system includes a heating element to heat the plurality of die bars.

According to a sixteenth aspect of the system of any of the preceding or following aspects, the system includes a controller programmed to heat the plurality of die bars, engage the plurality of die bars with the cushion assembly after reaching a threshold temperature, and actuate the actuator to drive the fasteners into the depressed channels of the cushion assembly.

According to a seventeenth aspect of the fasteners of any of the preceding or following aspects the fasteners cooperate with a trim cover to attach the trim cover to the cushion assembly.

According to an eighteenth aspect of the die(s) of any of the preceding or following aspects, the die(s) is thermally conductive or include a thermal conductor and the receptacle(s)/hollow jacket(s) is thermally insulating or include a thermal insulator.

According to a nineteenth aspect of the die(s) of any of the preceding or following aspects include iron, aluminum, and/or cooper and the receptacle(s)/hollow jacket(s) include plastic, fiberglass, and/or foam.

According to a twentieth aspect of the cushion assemblies of any of the preceding or following aspects, the cushion assemblies include cushion bodies of entangled and/or inter-twined polymeric strands such that depressed channels are formed in the cushion bodies.

What is claimed is:
1. A system, comprising:
 a cushion;
 a die configured to form a cavity in the cushion, the die comprising an orifice;

a receptacle cooperating with the die and aligned with the orifice, the receptacle arranged to receive a fastener; and an actuator to drive the fastener from the receptacle and through the orifice into the cushion such that the fastener is disposed in the cavity of the cushion formed by the die.

2. The system of claim 1, further comprising a heating element connected to the die, wherein the heating element is configured to heat the die.

3. The system of claim 2, wherein the receptacle is insulated for reducing heat received from the die to the fastener, wherein the fastener comprises a penetrating portion and a cooperating portion, the penetrating portion is configured to engage with the cushion and the cooperating portion is configured to attach the fastener to a trim cover, and wherein the cooperating portion comprises a pointed tip and a plurality of retaining elements comprising at least one of barbs or flat ridges that extend along a periphery of the penetrating portion.

4. The system of claim 2, wherein the heating element is an ultrasonic heater.

5. The system of claim 1, wherein the actuator is a solenoid actuator.

6. The system of claim 1, wherein the fastener cooperates with a trim cover to fasten the trim cover to the cushion.

7. A system, comprising:
one or more robotic arms;
a cushion assembly;
a plurality of die bars comprising a plurality of orifices and the plurality of die bars disposed on the one or more robotic arms such that when the plurality of die bars is heated and engaged with the cushion assembly, the plurality of die bars is configured to form depressed channels in the cushion assembly;

a plurality of hollow jackets cooperating with the plurality of die bars to receive a plurality of fasteners such that each fastener of the plurality of fasteners is aligned with a respective orifice of the plurality of orifices; and an actuator arranged to drive the plurality fasteners from the plurality of hollow jackets through the plurality of orifices into the cushion assembly such that the plurality of fasteners is disposed in the depressed channels.

8. The system of claim 7, further comprising a non-transitory computer readable medium having computer executable instruction thereon to be executed by a processor cooperating with the one or more robotic arm, and the actuator.

9. The system of claim 7, further comprising a heating element configured to heat the plurality of die bars.

10. The system of claim 7, further comprising a controller programmed to:
heat the plurality of die bars;
engage the plurality of die bars with the cushion assembly after reaching a threshold temperature; and
actuate the actuator to drive the fasteners into the depressed channels of the cushion assembly.

11. The system of claim 7, wherein the fasteners cooperate with a trim cover to attach the trim cover to the cushion assembly.

12. The system of claim 7, wherein the plurality of die bars includes a thermal conductor and the plurality hollow jackets include a thermal insulator.

13. The system of claim 12, wherein the plurality of die bars includes at least one of iron, aluminium, and copper and the plurality of hollow jackets includes at least one of plastic, fiberglass, and foam.

14. The system of claim 7, wherein the cushion assembly includes cushion bodies of entangled polymeric strands and the depressed channels are formed in the cushion bodies.

* * * * *